Jan. 27, 1959  F. P. HARRINGTON  2,870,700
VENTILATING PANELS
Filed Nov. 10, 1955

INVENTOR
FLORIAN P. HARRINGTON
BY
ATTORNEY

2,870,700

VENTILATING PANELS

Florian P. Harrington, Norfolk, Va.

Application November 10, 1955, Serial No. 546,163

1 Claim. (Cl. 98—96)

The present invention pertains to a panel formed of glass or plastic provided with perforations of unique shape for the purpose of providing ventilation through the pane and preventing the passage of rain through the openings in the panel.

An object of the invention is to provide a transparent plate or transparent laminated assembly with openings for the passage of air therethrough which slope upwardly in proceeding from the inner face of the panel and thereafter slope downwardly so that air or gas may pass in either direction through the openings but rain and the like will be prevented from moving through the openings.

Another object of the invention is to provide a plate like structure of the transparent character having openings therethrough so that the panes may be used for ventilating a kitchen, bathroom, or the like, and may be used in other places where a panel is desired for the passage of light and through which gas may pass without the disadvantage of rain or the like moving through the panel.

Other objects and features of the invention will be appreciated and become apparent upon consideration of the following detailed description taken in connection with the accompanying drawing wherein several embodiments of the invention are disclosed.

Figure 1:
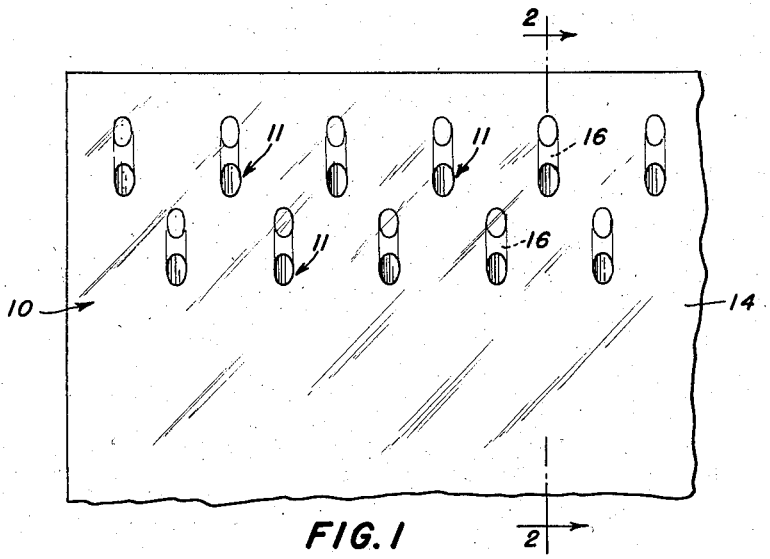
Fig. 1 is an elevational view of a face of a portion of a transparent panel provided with ventilating apertures exhibiting the invention.
Figure 2:
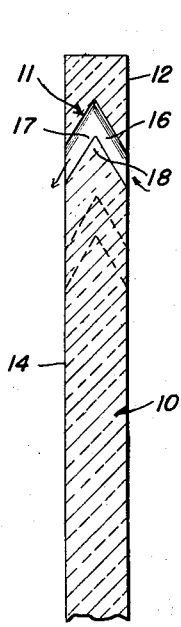
Fig. 2 is a sectional view taken on the line 2—2 of Fig. 1.

Referring to the drawing there is shown in Figs. 1 and 2 a plate 10 which may be formed of glass or plastic having transparent characteristics. The plate or panel 10 may be of any desired dimensions so as to serve as one of a number of panes for a window or it may be of a dimension so as to close an entire window opening.

The transparent panel is provided with a plurality of openings which extend therethrough. The ventilating openings 11 are spaced from each other and while they are shown in Fig. 1 as being in aligned horizontal rows they may be arranged in any desired pattern over a portion of the panel or be formed only in the upper portion as shown in Fig. 1. The inside face of the pane is indicated at 12 and the outer face is represented at 14. Each opening 11 extends upwardly from the inner face 12 preferably at an angle of forty-five degrees with respect to the inner face. Such inclination of the opening continues and reaches its highest elevation in a central plane equal distance from the inner face 12 and outer face 14. This upwardly inclined portion of the opening is indicated at 16 in Fig. 2. Outwardly beyond the mid-plane of the panel the opening 11 slopes downwardly preferably at an angle of forty-five degrees with respect to the outside face 14. This portion of the opening is indicated at 17. Each of the passages through the transparent plate or panel are similarly shaped so as to provide a hump portion at 18 in the passageway.

When the panel is provided with a plurality of such openings hot gases or air may pass outwardly through the openings 11 as indicated by the arrows in Fig. 2. The passages are so constructed that rain striking against the outer face 14 of the pane will drain from the portion 17 of the openings and the humps 18 are at sufficiently elevated positions with reference to the outer portals of the openings that the water does not find its way to the inside of the enclosure.

Figure 3:
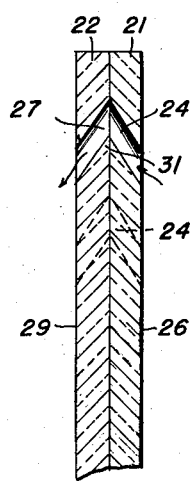
Fig. 3 is a similar sectional view showing a modification.

In the embodiment shown in Figs. 1 and 2 the panel or plate 10 is formed of a single plate or sheet. If desired the transparent panel may be constructed of two transparent sheets of glass or plastic 21 and 22 as shown in Fig. 3. In this construction the sheet 21 is provided with a plurality of openings 24 which slope upwardly in proceeding from the inner face 26. The sheet 22 is provided with a plurality of openings 27 which are spaced to register with the openings 24. The openings 27 slope upwardly in proceeding from the outer face 29 of the sheet 22. The two sheets 21 and 22 with the openings in registration as shown in Fig. 3 may be secured to each other in any desired manner. Air or gas may pass outwardly through the openings as shown by the arrows in Fig. 3 and rain is prevented from moving through the openings by reason of the humped areas 31 in the mid-portion of the passages.

While the invention has been described with reference to particular materials and with reference to straight angular types of passages through the entire panel it is apparent that changes may be made in the materials as well as in the shape of the passages. Such modifications and others may be made without departing from the spirit and scope of the invention as set forth in the appended claim.

What I claim and desire to secure by Letters Patent is:

A rigid vertically disposed panel providing a pane for a window opening comprising, substantially rigid plate means formed of impervious material having an outer face in one continuous plane and an inner face in one continuous plane substantially parallel to the outer face, said plate means having light transmitting characteristics, said plate means having openings extending therethrough, each opening being of generally circular cross section sloping upwardly from said inner face of the plate means to a mid-portion thereof and thereafter sloping downwardly in proceeding to the outer face of the plate means, and the portals of each opening being flush with the faces of said plate means.

References Cited in the file of this patent

UNITED STATES PATENTS

| 1,390,347 | Elliston | Sept. 13, 1921 |
| 2,019,186 | Kaiser | Oct. 29, 1935 |

FOREIGN PATENTS

| 27,954 of 1896 | Great Britain | Feb. 13, 1897 |